(12) United States Patent
Okubo

(10) Patent No.: US 10,839,236 B2
(45) Date of Patent: Nov. 17, 2020

(54) VEHICLE EXTERIOR ENVIRONMENT RECOGNITION APPARATUS

(71) Applicant: SUBARU CORPORATION, Tokyo (JP)

(72) Inventor: Toshimi Okubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 36 days.

(21) Appl. No.: 16/241,804

(22) Filed: Jan. 7, 2019

(65) Prior Publication Data
US 2019/0294899 A1 Sep. 26, 2019

(30) Foreign Application Priority Data
Mar. 22, 2018 (JP) .................................. 2018-054906

(51) Int. Cl.
*G06K 9/62* (2006.01)
*G06K 9/00* (2006.01)
(Continued)

(52) U.S. Cl.
CPC ............ *G06K 9/00825* (2013.01); *G06T 7/74* (2017.01); *G06T 7/97* (2017.01); *G06T 2207/20224* (2013.01); *G06T 2207/30261* (2013.01)

(58) Field of Classification Search
CPC .......... G06K 9/00825; G06K 9/00805; G06K 9/00201; G06K 9/00791; G06T 7/74;
(Continued)

(56) References Cited

U.S. PATENT DOCUMENTS

2012/0062694 A1* 3/2012 Muramatsu ............... G06T 5/50
348/36
2013/0129150 A1* 5/2013 Saito .................. G06K 9/00825
382/104

FOREIGN PATENT DOCUMENTS

JP 3349060 B2 11/2002
JP 2011-254170 A 12/2011
(Continued)

OTHER PUBLICATIONS

Japanese Notice of Reasons for Refusal issued in corresponding Japanese Patent Application No. 2018-054906, dated Nov. 26, 2019, with English translation.

*Primary Examiner* — Dhaval V Patel
(74) *Attorney, Agent, or Firm* — McDermott Will & Emery LLP

(57) ABSTRACT

A vehicle exterior environment recognition apparatus includes first and luminance-image acquiring units, first and second distance-image generating units, and a composite-image generating unit. The first luminance-image acquiring unit acquires first luminance images captured by image-capturing units that are disposed at positions different from each other at a first exposure time. The second luminance-image acquiring unit acquires second luminance images captured by the image-capturing units at a second exposure time shorter than the first exposure time. The first distance-image generating unit generates a first distance image through pattern matching of the first luminance images. The second distance-image generating unit generates a second distance image through pattern matching of the second luminance images. The composite-image generating unit generates a composite image by extracting one of any of blocks of the first distance image and corresponding one of blocks of the second distance image that includes a distance having higher reliability.

13 Claims, 9 Drawing Sheets

(51) Int. Cl.
*G06T 7/73* (2017.01)
*G06T 7/00* (2017.01)

(58) Field of Classification Search
CPC ............. G06T 7/97; G06T 2207/20224; G06T 2207/30261; G06T 2207/10012; G06T 2207/10144; G06T 2207/20221; G06T 7/70; G06T 7/593; G06T 5/50; G06T 5/009; G06T 2207/20208
See application file for complete search history.

(56) References Cited

FOREIGN PATENT DOCUMENTS

| | | |
|---|---|---|
| JP | 2013-109391 A | 6/2013 |
| JP | 2015-073185 A | 4/2015 |

\* cited by examiner

VEHICLE EXTERIOR ENVIRONMENT RECOGNITION APPARATUS

CROSS-REFERENCE TO RELATED APPLICATIONS

The present application claims priority from Japanese Patent Application No. 2018-054906 filed on Mar. 22, 2018, the entire contents of which are hereby incorporated by reference.

BACKGROUND

The technology relates to a vehicle exterior environment recognition apparatus that identifies a specific object present in a traveling direction of an own vehicle.

A technique has been proposed which detects a three-dimensional object, such as a preceding vehicle located ahead of an own vehicle, to perform a control that avoids contact with the preceding vehicle (i.e., a contact avoidance control) or to perform a control that keeps a predetermined inter-vehicular distance from the own vehicle to the preceding vehicle (i.e., a cruise control). For example, reference is made to Japanese Patent No. 3349060.

SUMMARY

An aspect of the technology provides a vehicle exterior environment recognition apparatus including: a first luminance-image acquiring unit configured to acquire a plurality of first luminance images captured by a plurality of image-capturing units at a predetermined first exposure time, in which the plurality of image-capturing units are disposed at respective positions different from each other; a second luminance-image acquiring unit configured to acquire a plurality of second luminance images captured by the plurality of image-capturing units at a second exposure time, in which the second exposure time is shorter than the first exposure time; a first distance-image generating unit configured to generate a first distance image through pattern matching of the plurality of first luminance images; a second distance-image generating unit configured to generate a second distance image through pattern matching of the plurality of second luminance images; and a composite-image generating unit configured to generate a composite image by extracting one of a first block of the first distance image and a second block of the second distance image, in which the one of the first block of the first distance image and the second block of the second distance image includes a distance having higher reliability, the first block is any of blocks of the first distance image, and the second block is one of blocks of the second distance image corresponding to the first block.

An aspect of the technology provides a vehicle exterior environment recognition apparatus including circuitry configured to acquire a plurality of first luminance images captured by a plurality of image-capturing units at a predetermined first exposure time, in which the plurality of image-capturing units are disposed at respective positions different from each other, acquire a plurality of second luminance images captured by the plurality of image-capturing units at a second exposure time, in which the second exposure time is shorter than the first exposure time, generate a first distance image through pattern matching of the plurality of first luminance images, generate a second distance image through pattern matching of the plurality of second luminance images, and generate a composite image by extracting one of a first block of the first distance image and a second block of the second distance image, in which the one of the first block of the first distance image and the second block of the second distance image includes a distance having higher reliability, the first block is any of blocks of the first distance image, and the second block is one of blocks of the second distance image corresponding to the first block.

BRIEF DESCRIPTION OF THE DRAWINGS

The accompanying drawings are included to provide a further understanding of the technology and are incorporated in and constitute a part of this specification. The drawings illustrate example implementations and, together with the specification, serve to explain the principles of the technology.

DETAILED DESCRIPTION

Figure 1:
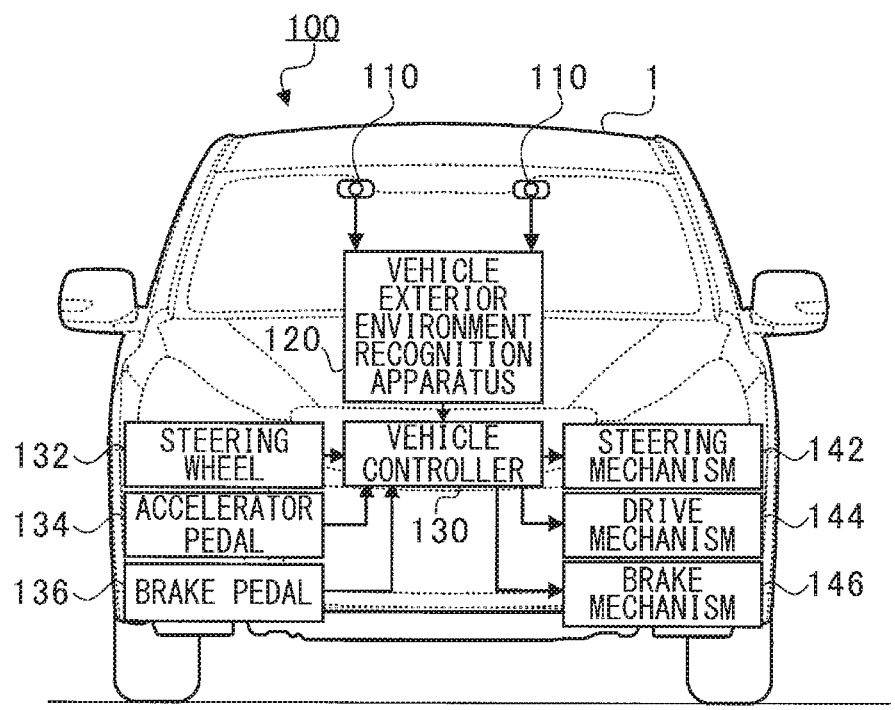
FIG. 1 is a block diagram illustrating an example relation of connection in a vehicle exterior environment recognition system according to one implementation of the technology.

In the following, some implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the technology are optional and may be provided on an as-needed basis. Throughout the present specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

To achieve a contact avoidance control or a cruise control, it is required to properly recognize a vehicle exterior environment ahead of an own vehicle by adjusting an exposure, and to identify whether a three-dimensional object present in a traveling direction of the own vehicle is a specific object such as a preceding vehicle. However, in some cases, part of an image captured by an image-capturing unit is difficult to be identified in spite of all adjustments of the exposure, due to white-clipping (overexposure) of a sunny region and black-clipping (underexposure) of a shady region, for example.

To effectively obtain gradations of both such bright images and such dark images, high-dynamic-range (HDR) rendering, which allows for displays in a wider dynamic range, may be adopted. In the case of image capturing by a single image-capturing unit (i.e., monocular imaging), the HDR rendering is able to work effectively; however, in the case of stereo matching that involves image capturing by a plurality of image-capturing units (i.e., compound-eye imaging), the HDR rendering is independently performed in each of the image-capturing units, which may possibly result in even higher mismatching rate.

For example, if the gradation of each image is individually adjusted on the basis of its noise characteristic during expansion of the dynamic range (from 256 to 1024, for example) followed by compression of the dynamic range (from 1024 to 256, for example), right and left images may possibly fall out of synchronization with each other, causing a difficulty in matching between a portion in the right image and a portion in left image that belong to an identical three-dimensional object.

It is desirable to provide a vehicle exterior environment recognition apparatus that makes it possible to identify a three-dimensional object in a wide dynamic range even through stereo matching.

[Vehicle Environment Recognition System 100]

FIG. 1 is a block diagram illustrating an example relation of connection in a vehicle exterior environment recognition system 100 according to an example implementation of the technology. The vehicle exterior environment recognition system 100 may include a plurality of image-capturing units 110, a vehicle exterior environment recognition apparatus 120, and a vehicle controller (e.g., an engine control unit (ECU)) 130. In an example implementation of the technology illustrated in FIG. 1, the number of the image-capturing units 110 may be two.

The image-capturing units 110 each may include an imaging device such as, but not limited to, a charge-coupled device (CCD) or a complementary metal-oxide semiconductor (CMOS). The image-capturing units 110 each may capture an image of a vehicle exterior environment ahead of the own vehicle 1, and may generate a luminance image (e.g., color image or monochrome image) including at least luminance information. The two image-capturing units 110 may be separated away from each other in a substantially horizontal direction. The two image-capturing units 110 may be disposed so that their respective optical axes are to be substantially parallel to each other along a traveling direction of the own vehicle 1. The image-capturing units 110 may continuously generate a luminance image for each frame of, for example but not limited to, 1/60 second (at a frame rate of 60 fps). The luminance image may be obtained as a result of the image capturing performed on a detection region ahead of the own vehicle 1. Non-limiting examples of a three-dimensional object to be recognized with the image-capturing units 110 may include a three-dimensional object independently present, as well as an object identifiable as a part of the three-dimensional object. Non-limiting examples of the independently-present three-dimensional object may include a bicycle, a pedestrian, a vehicle, a traffic light, a road sign, a guardrail, and a building. Non-limiting examples of the object identifiable as a part of the three-dimensional object may include a wheel of a bicycle.

The vehicle exterior environment recognition apparatus 120 may receive the luminance images respectively from the two image-capturing units 110, and may perform so-called pattern matching between the luminance images. Through the pattern matching, the vehicle exterior environment recognition apparatus 120 may generate a distance image that includes parallax information that includes a parallax and an image position that indicates the position of any block in the image. Details of the pattern matching and the distance image is described below.

The vehicle exterior environment recognition apparatus 120 may also identify a road surface using three-dimensional position information in a real space. The three-dimensional position information may include a luminance value (e.g., color value) calculated from the luminance image and a relative distance from the own vehicle 1 calculated from the distance image. Thereafter, the vehicle exterior environment recognition apparatus 120 may perform grouping of blocks that are located on the identified road surface, equal to each other in color value, and close to each other in the three-dimensional position information into a single three-dimensional object. Thereafter, the vehicle exterior environment recognition apparatus 120 may identify which specific object (e.g., a preceding vehicle or bicycle) the three-dimensional object located in the detection region ahead of the own vehicle 1 corresponds to.

After the identification of the three-dimensional object, the vehicle exterior environment recognition apparatus 120 may perform a contact avoidance control to avoid contact of the own vehicle 1 with the three-dimensional object, or a cruise control to keep a predetermined inter-vehicular distance from the own vehicle 1 to the preceding vehicle for safety. The relative distance may be calculated by converting the parallax information per block of the distance image into the three-dimensional position information by a so-called stereo method. The stereo method may derive, from the parallax of any part of the three-dimensional object, the relative distance between the part of the three-dimensional object and the image-capturing units 110 by a triangulation method. Such a technique to derive three-dimensional position information from two-dimensional parallax information is also referred to as "stereo matching".

The vehicle controller 130 may receive an operation input by the driver through a steering wheel 132, an accelerator pedal 134, and a brake pedal 136, and transmit the operation input to a steering mechanism 142, a drive mechanism 144, and a brake mechanism 146, thereby controlling the own vehicle 1. The vehicle controller 130 may also control the steering mechanism 142, the drive mechanism 144, and the brake mechanism 146, in accordance with instructions from the vehicle exterior environment recognition apparatus 120.

As described above, the environment recognition system 100 may identify the three-dimensional position of a three-dimensional object, such as a preceding vehicle, through the stereo matching of the luminance images captured by the two respective image-capturing units 110. However, some of the images captured by the image-capturing units 110 may possibly include regions that are difficult to be identified due to white clipping of a sunny region and black clipping of a shady region. This may possibly hinder proper identification of a three-dimensional object that actually present in the region.

Figure 2A:
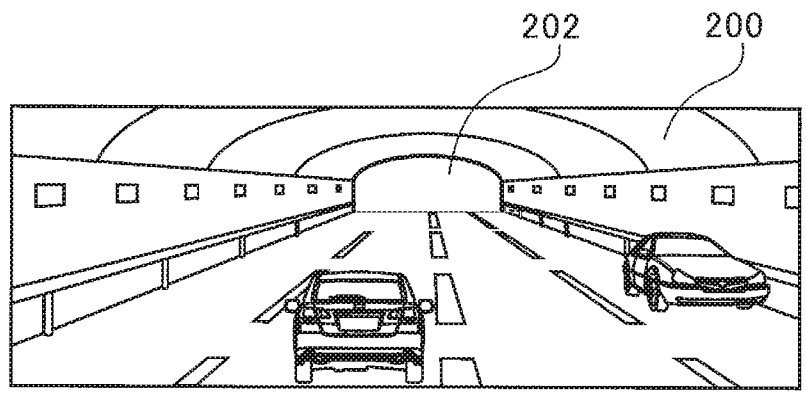
FIG. 2A illustrates an example relation between an exposure time and an image captured by an image-capturing unit illustrated in FIG. 1.
Figure 2B:
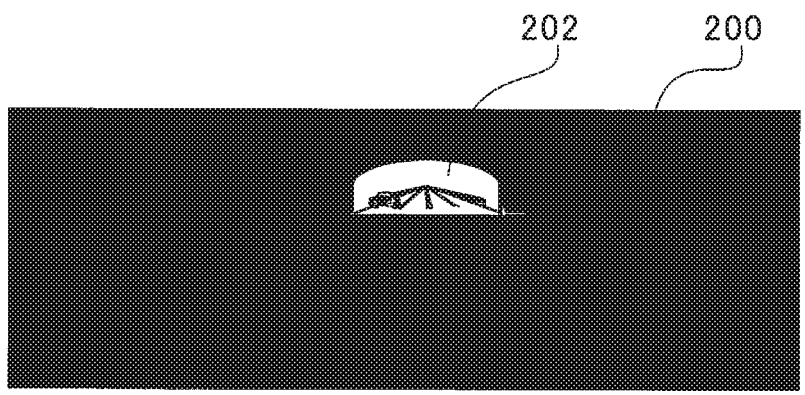
FIG. 2B illustrates an example relation between an exposure time and an image captured by an image-capturing unit illustrated in FIG. 1.

FIGS. 2A and 2B each illustrate an example relation between an exposure time and an image captured by the image-capturing unit 110. For example, if a long exposure time is set when the own vehicle 1 travels into a tunnel, a road and a three-dimensional object that are located in a region 200 in the tunnel is properly obtained, as illustrated in FIG. 2A. However, a region 202 ahead of the exit of the tunnel is overexposed due to intense sun light. This may possibly hinder acquisition of information on the region 202 illustrated in FIG. 2A.

If a short exposure time is set in this circumstance to obtain the information on the region 202 illustrated in FIG. 2A, the road and the three-dimensional object that are located in the region 202 ahead of the exit of the tunnel is properly obtained, as illustrated in FIG. 2B. However, the region 200 in the tunnel that is obtained in FIG. 2A is underexposed. This may possibly hinder acquisition of the information on the region 200 in the tunnel.

To effectively obtain gradations of both such high-gradation images and such dark images, the high-dynamic-range (HDR) rendering, which allows for displays in a wider dynamic range, may be adopted. However, in case of the stereo matching that involves a plurality of image-capturing unit 110, the HDR rendering is independently performed in each of the image-capturing units 110, which may possibly result in even higher mismatching rate. To address such a concern, an example implementation of the technology may provide improved image-capturing that makes it possible to identify a three-dimensional object in a wide dynamic range even in the case of the stereo matching.

[Vehicle Exterior Environment Recognition Apparatus 120]

Figure 3:
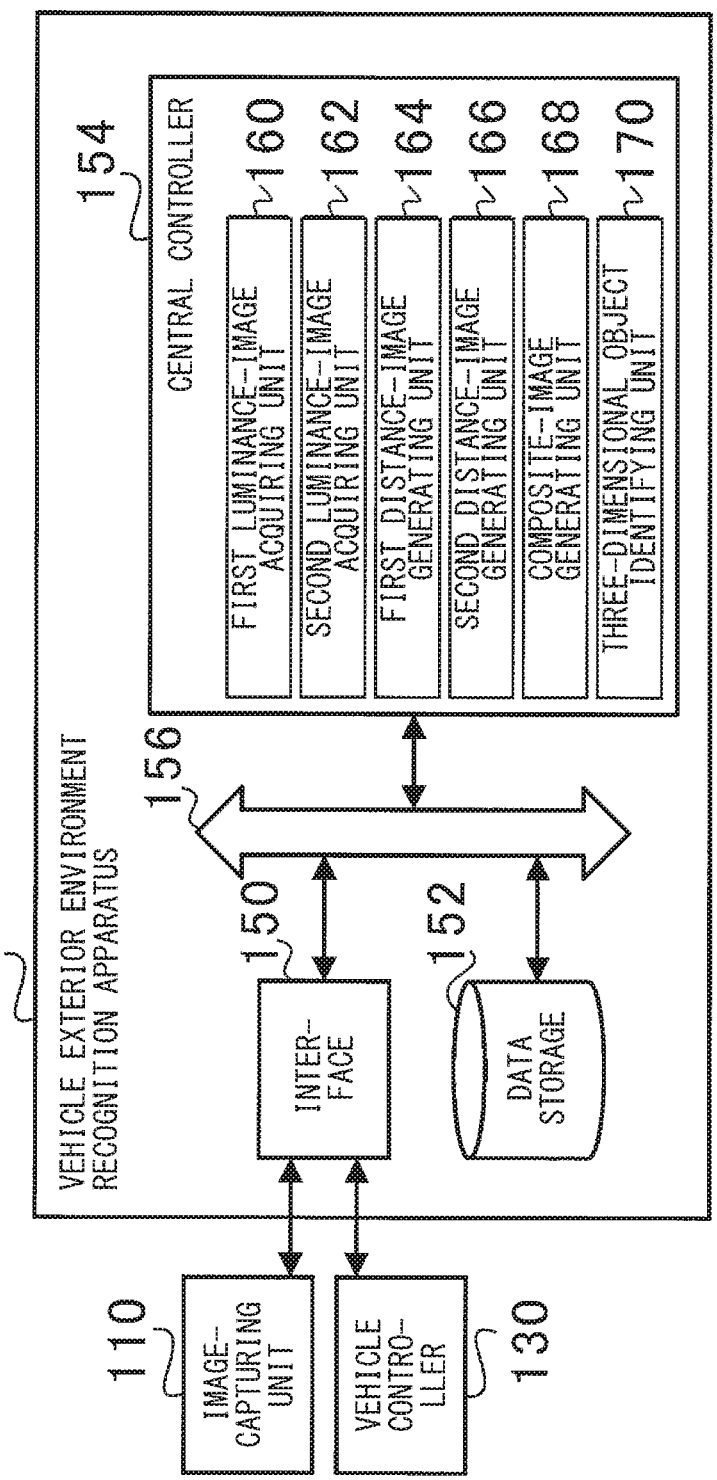
FIG. 3 is a block diagram illustrating a schematic configuration of the vehicle exterior environment recognition apparatus.

FIG. 3 is a block diagram illustrating a schematic configuration of the vehicle exterior environment recognition apparatus 120. As illustrated in FIG. 3, the vehicle exterior environment recognition apparatus 120 may include an interface (I/F) 150, a data storage 152, and a central controller 154.

The interface 150 may exchange information bidirectionally between the image-capturing unit 110 and the vehicle controller 130. The data storage 152 may include, for example, a random access memory (RAM), a flash memory, and a hard disk drive (HDD), and may store various pieces of information necessary for processes to be carried out by the components described hereinafter.

The central controller 154 may include a semiconductor integrated circuit, and may control devices including, without limitation, the interface 150 and the data storage 152 through a system bus 156. The semiconductor integrated circuit may have devices such as, but not limited to, a central processing circuit (CPU), a read only memory (ROM) in which programs, etc., are stored, and a random access memory (RAM) serving as a work area. In this example implementation, the central controller 154 may also serve as a first luminance-image acquiring unit 160, a second luminance-image acquiring unit 162, a first distance-image generating unit 164, a second distance-image generating unit 166, a composite-image generating unit 168, and a three-dimensional object identifying unit 170. In the following, a process of generating a distance image (composite image) is described in detail as one feature of this example implementation with reference to operation of each of the components of the central controller 154.

[Vehicle Exterior Environment Recognition Procedure]

Figure 4:
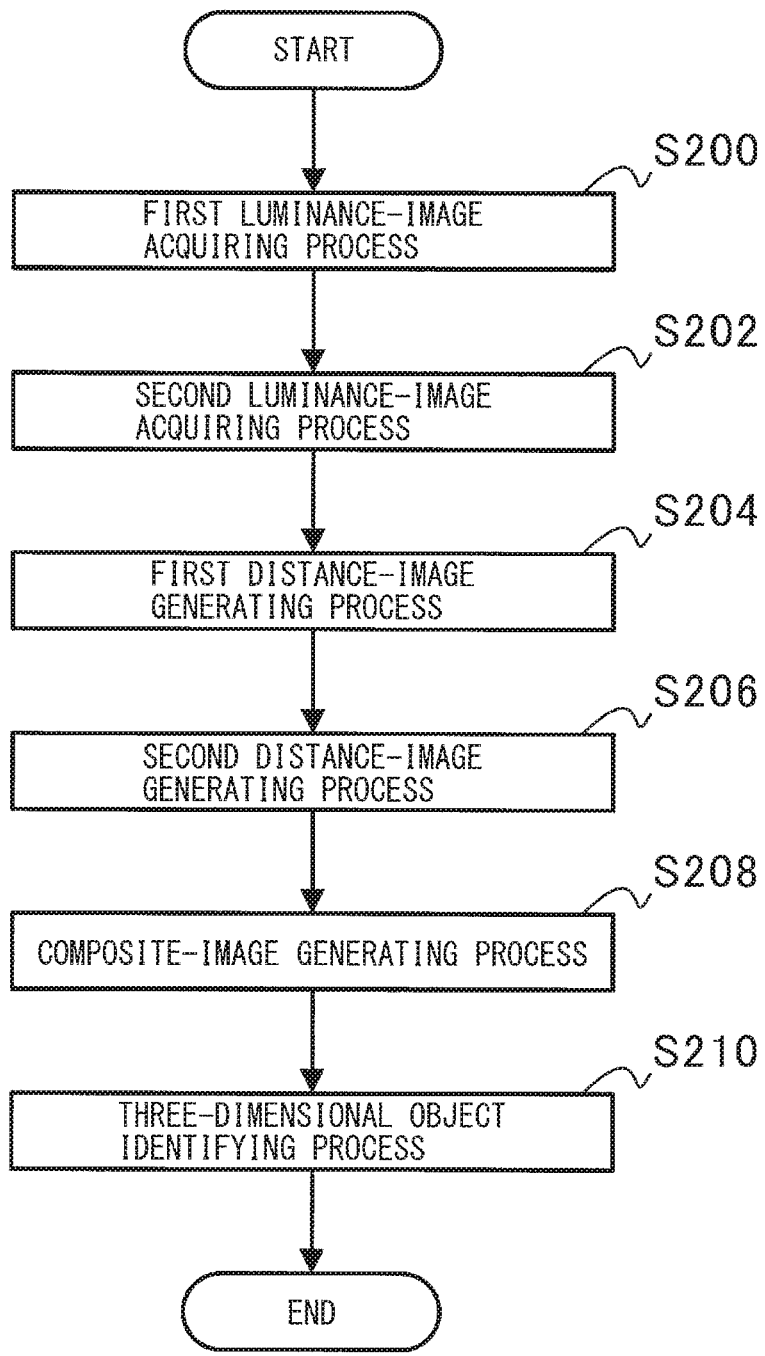
FIG. 4 is a flowchart illustrating a vehicle exterior environment recognition procedure according to one implementation of the technology.

FIG. 4 is a flow chart illustrating a vehicle exterior environment recognition procedure according to an example implementation of the technology. In the vehicle exterior environment recognition procedure, the first luminance-image acquiring unit 160 performs a first luminance-image acquiring process (S200) of acquiring two first luminance images captured by the two image-capturing units 110 at a predetermined first exposure time. Thereafter, the second luminance-image acquiring unit 162 performs a second luminance-image acquiring process (S202) of acquiring two second luminance images captured by the two image-capturing units 110 at a second exposure time. The second exposure time is shorter than the first exposure time.

Thereafter, the first distance-image generating unit 164 performs a first distance-image generating process (S204) of generating a first distance image through the pattern matching of the first luminance images. Thereafter, the second distance-image generating unit 166 performs a second distance-image generating process (S206) of generating a second distance image through the pattern matching of the second luminance images.

Thereafter, the composite-image generating unit 168 performs a composite-image generating process (S208) of generating a composite image by extracting one of a first block of the first distance image and a second block of the second distance image that includes a distance having higher reliability. The first block is any of blocks of the first distance image, and the second block is one of blocks of the second distance image corresponding to the first block. Thereafter, the three-dimensional object identifying unit 170 may perform a three-dimensional object identifying process (S210) of identifying a three-dimensional object on the basis of the composite image. Each of the processes are described in detail below.

[First Luminance-Image Acquiring Process S200]

The first luminance-image acquiring unit 160 may set a predetermined first exposure time for the two image-capturing units 110 to obtain two first luminance images captured by the image-capturing units 110. Note that the term "exposure time" as used herein refers to a time while an imaging device is exposed to light through a lens. The first exposure time may be relatively long so that a relatively dark region (e.g., shady region) in the vehicle exterior environment is not underexposed and an edge of the dark region is allowed to be obtained.

Figure 5A:
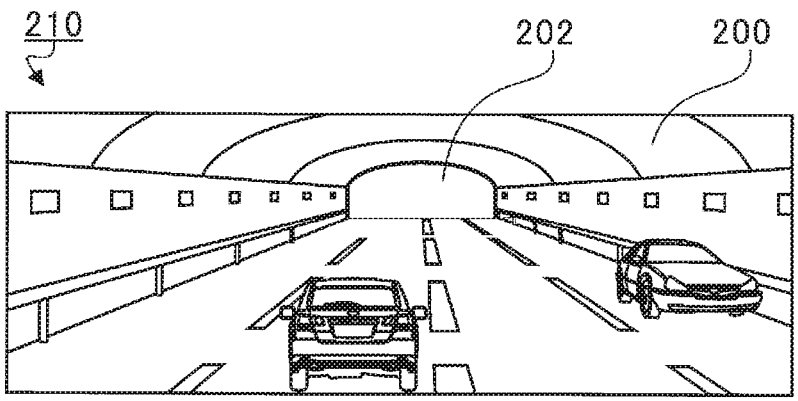
FIGS. 5A and 5B illustrate an example first luminance image captured by the image-capturing unit illustrated in FIG. 1.
Figure 5B:
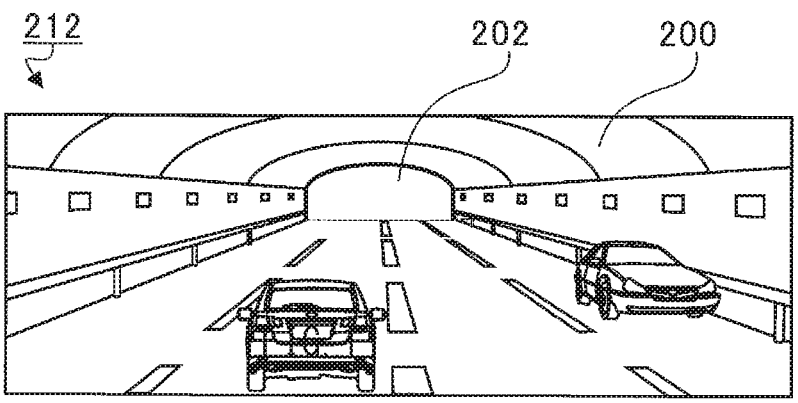

FIGS. 5A and 5B each illustrate an example of the first luminance image. FIG. 5A illustrates a first luminance image 210 captured by a left one of the image-capturing units 110 that are separated away from each other in the substantially horizontal direction, and FIG. 5B illustrates a first luminance image 212 captured by a right one of the image-capturing units 110. Since these images are captured at the relatively long exposure time, the region 200 in the tunnel is properly obtained, whereas the region 202 ahead of the exit of the tunnel is overexposed due to intense sun light.

[Second Luminance-Image Acquiring Process S202]

The second luminance-image acquiring unit 162 may set a predetermined second exposure time for the two image-capturing units 110 to obtain a plurality of second luminance images captured by the image-capturing units 110. The second exposure time may be relatively short so that a relatively bright region (e.g. sunny region) in the vehicle exterior environment is not overexposed and an edge of the bright region is allowed to be obtained. To suppress the exposure, the second exposure time may be shorter than the first exposure time. In an example implementation of the technology, a time interval between the image capturing by the first luminance-image acquiring unit 160 and the image capturing by the second luminance-image acquiring unit 162 may be significantly short to ensure synchronization between the images.

Figure 6A:
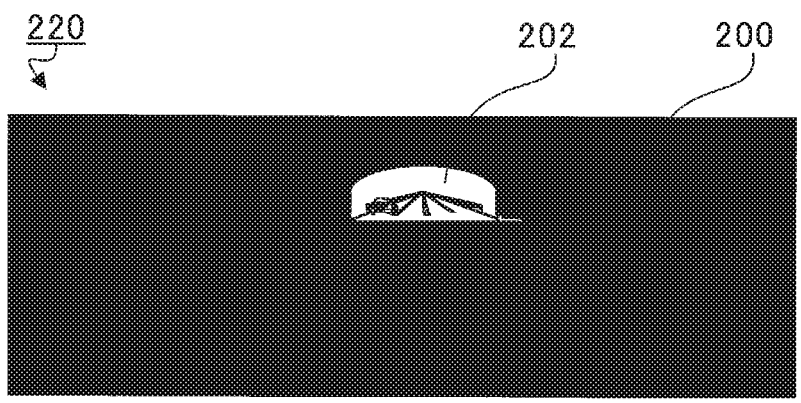
FIGS. 6A and 6B illustrate an example second luminance image captured by the image-capturing unit illustrated in FIG. 1.
Figure 6B:
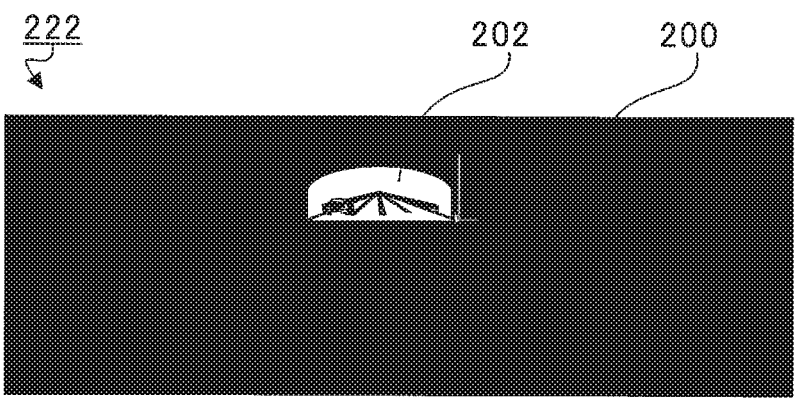

FIGS. 6A and 6B each illustrate an example of the second luminance image. FIG. 6A illustrates a second luminance image 220 captured by a left one of the image-capturing units 110 that are separated away from each other in the substantially horizontal direction, and FIG. 6B illustrates a second luminance image 222 captured by a right one of the image-capturing units 110. Since these images are captured at the relatively short exposure time, the region 202 ahead of the exit of the tunnel is properly obtained, whereas the region 200 in the tunnel is underexposed.

[First Distance-Image Generating Process S204]

The first distance-image generating unit 164 generates a single first distance image through the pattern matching of the two first luminance images 210 and 212 acquired by the first luminance-image acquiring unit 160. The first distance image may include parallax information.

Figure 7A:
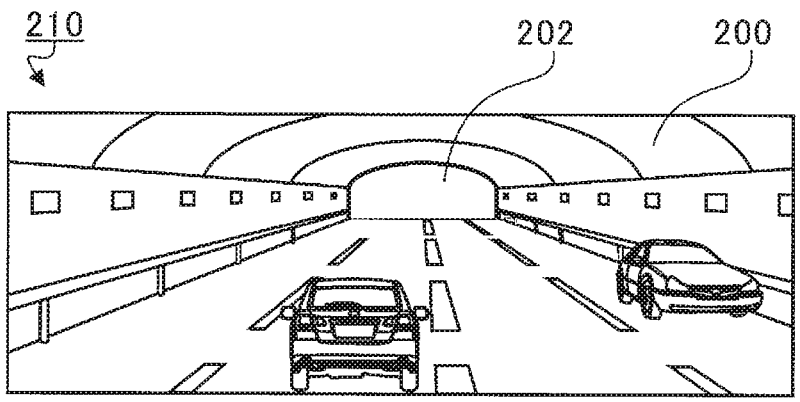
FIGS. 7A to 7C illustrate generation of a first distance image according to one implementation of the technology.
Figure 7B:
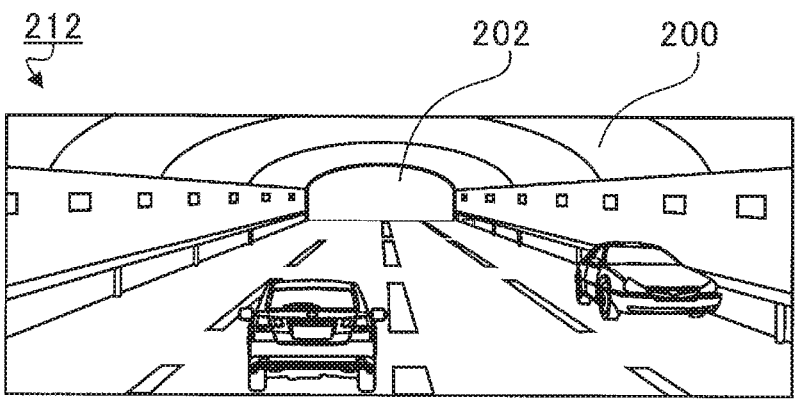
Figure 7C:
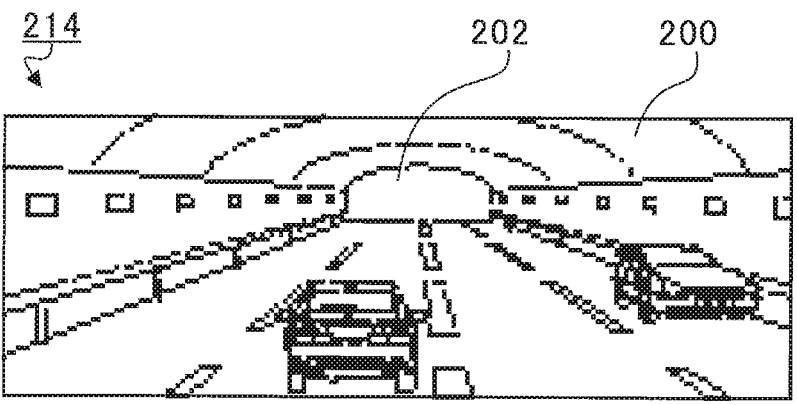

FIGS. 7A to 7C illustrate generation of the first distance image according to an example implementation of the technology. In this example implementation, the first distance-image generating unit 164 performs the pattern matching of the first luminance image 210 illustrated in FIG. 7A and the first luminance image 212 illustrated in FIG. 7B.

For example, the first distance-image generating unit 164 may retrieve any block from one of the first luminance image 210 and 212 and search the other of the first luminance image 210 and 212 for a corresponding block (i.e., perform the pattern matching), thereby deriving parallax information that includes the parallax and image position that indicates the position of the retrieved block in the image. The retrieved block may include, for example but not limited to, an array of four horizontal pixels by four vertical pixels. The term "horizontal" as used herein refers to a lateral direction of a screen of the captured image, and the term "vertical" refers to a longitudinal direction of the screen of the captured image. In the pattern matching, luminance (Y) may be compared per predetermined number of blocks between the paired images. Non-limiting examples of a technique for the comparison may include SAD (Sum of Absolute Difference) that obtains luminance differences, SSID (Sum of Squared Intensity Difference) that uses the squared differences, and ZNCC (Zero-mean Normalized Cross Correlation) that obtains similarity of variance obtained by subtracting an average luminance value from a luminance value of each pixel.

The vehicle exterior environment recognition apparatus 120 may perform such a parallax deriving process, on a block basis, for all blocks displayed in the detection region. The detection region may be, for example but not limited to, an array of 600 horizontal pixels by 200 vertical pixels. In this example implementation, each of the blocks may include the array of four horizontal pixels by four vertical pixels; however, any number of pixels may be included in each of the blocks. Through the pattern matching described above, a first distance image 214 illustrated in FIG. 7C is generated.

Since the image of the region 200 in the tunnel is properly obtained in the first luminance image 210 illustrated in FIG. 7A and the first luminance image 212 illustrated in FIG. 7B, the parallax information on the region 200 in the tunnel is properly derived in the first distance image 214 illustrated in FIG. 7. However, since the image of the region 202 ahead of the exit of the tunnel is overexposed in the first luminance images 210 and 212, a distance of the region 202 derived through the pattern matching has low reliability.

[Second Distance-Image Generating Process S206]

The second distance-image generating unit 166 generates a single second distance image through the pattern matching of the two second luminance images 220 and 222 acquired by the second luminance-image acquiring unit 162. The second distance image may include parallax information.

Figure 8A:
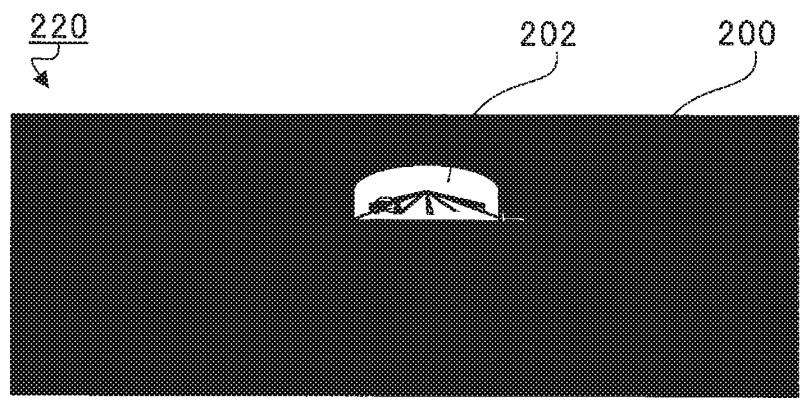
FIGS. 8A to 8C illustrate generation of a second distance image according to one implementation of the technology.
Figure 8B:
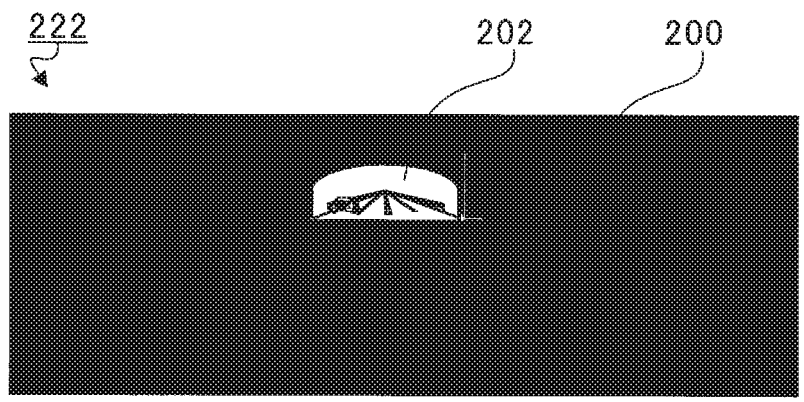
Figure 8C:
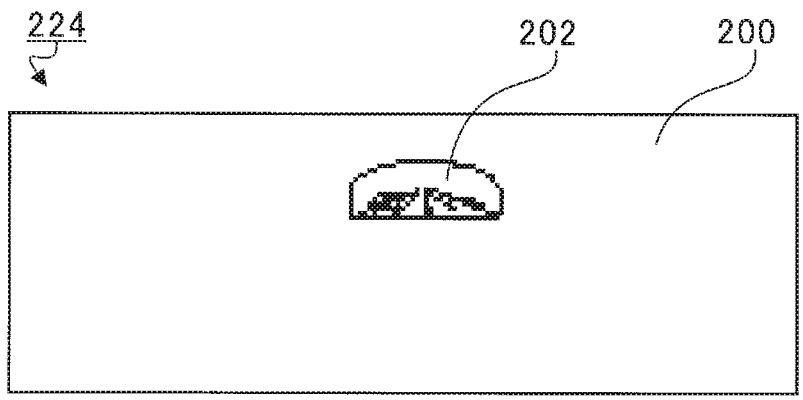

FIGS. 8A to 8C illustrate generation of the second distance image according to an example implementation of the technology. In this example implementation, the second distance-image generating unit 166 performs the pattern matching of the second luminance image 220 illustrated in FIG. 8A and the second luminance image 222 illustrated in FIG. 8B. Through the pattern matching, a second distance image 224 illustrated in FIG. 8C is generated.

Since the image of the region 202 ahead of the exit of the tunnel is properly obtained in the second luminance image 220 illustrated in FIG. 8A and the second luminance image 222 illustrated in FIG. 8B, the parallax information on the region 202 ahead of the exit of the tunnel is properly derived in the second distance image 224 illustrated in FIG. 8C. However, since the image of the region 200 in the tunnel is underexposed in the second luminance images 220 and 222, a distance of the region 200 derived through the pattern matching has low reliability.

[Composite-Image Generating Process S208]

The composite-image generating unit 168 generates a single composite image from the first distance image 214 and the second distance image 224 by extracting one of a first block of the first distance image 214 and a second block of the second distance image 224 that includes a distance having higher reliability. The first block is any of the blocks of the first distance image 214, and the second block is one of the blocks of the second distance image 224 corresponding to the first block.

Figure 9A:
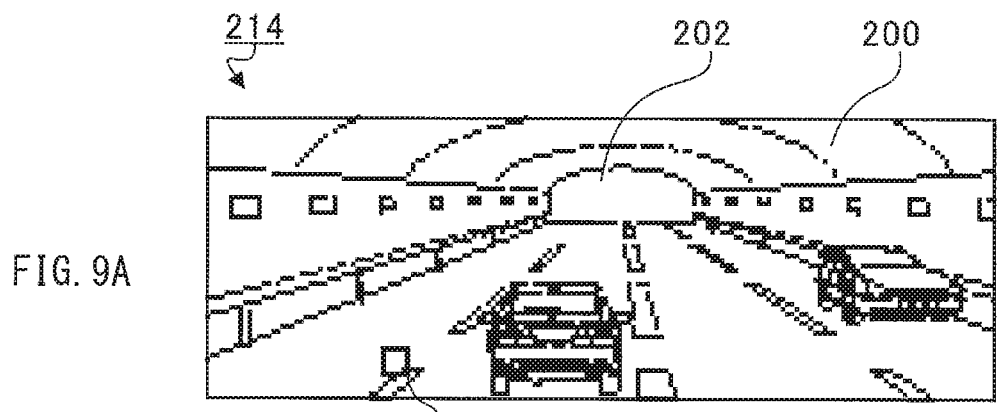
FIGS. 9A to 9C illustrate generation of a composite image according to one implementation of the technology.
Figure 9B:
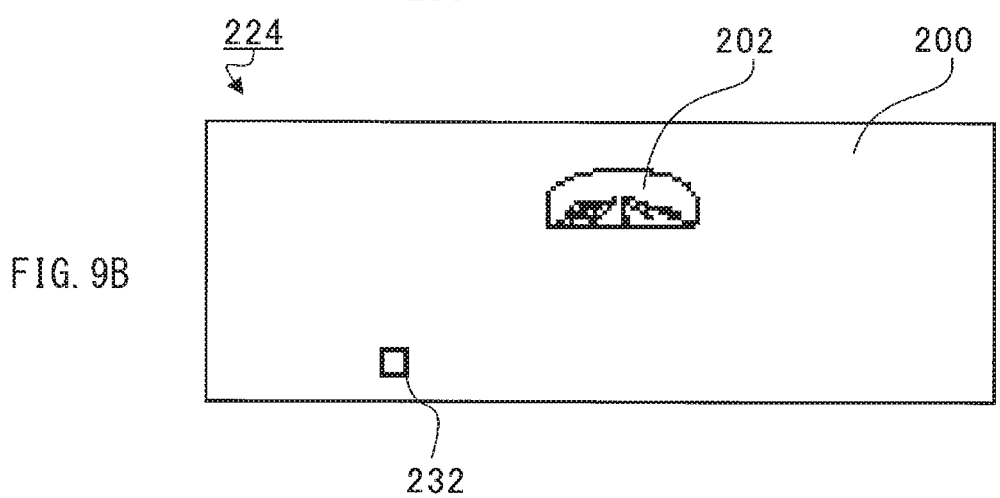
Figure 9C:
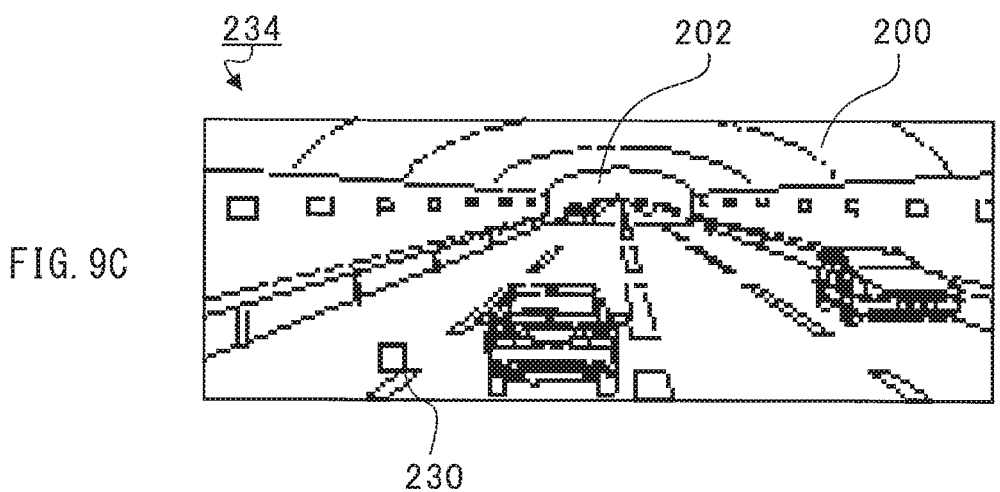
Figure 10:
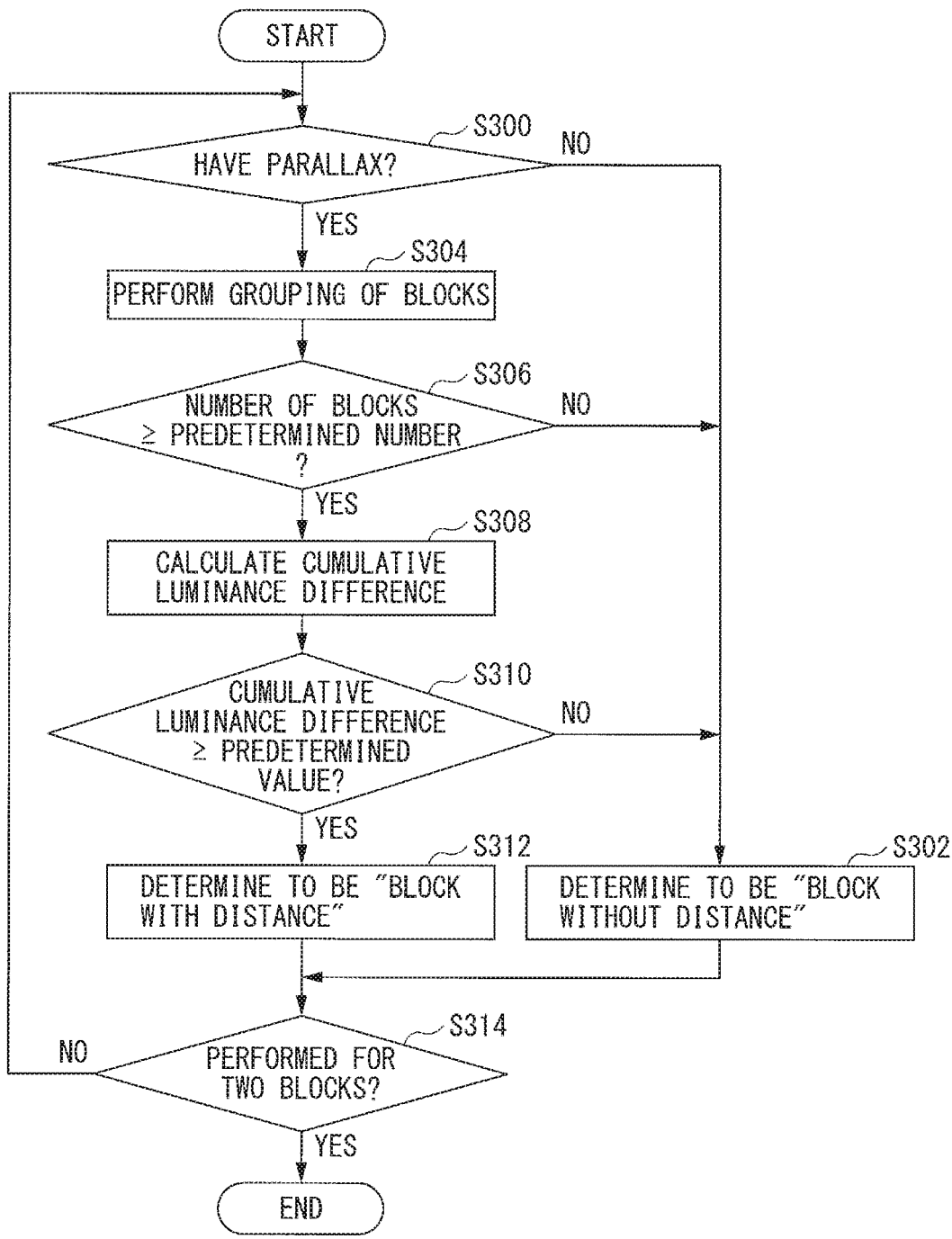
FIG. 10 is a flowchart illustrating a distance presence determining process according to one implementation of the technology.
Figures 11, 12:
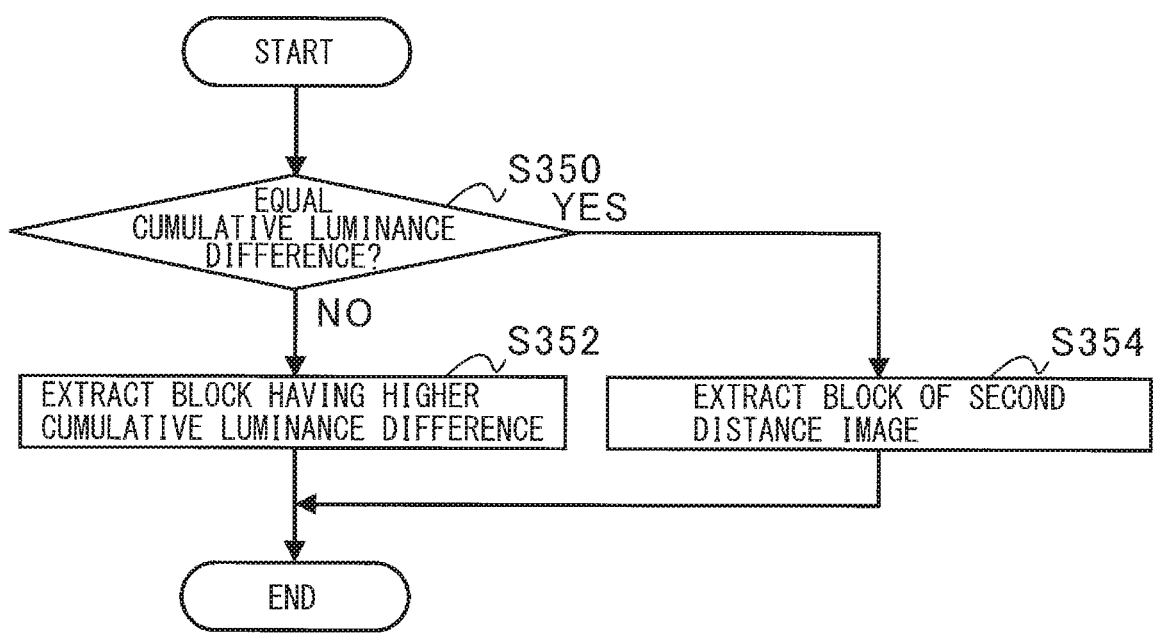
FIG. 11 illustrates conditions for extracting a block having higher reliability according to one implementation of the technology.
FIG. 12 is a flowchart illustrating a cumulative luminance difference determining process according to one implementation of the technology.

FIGS. 9A to 9C illustrate generation of the composite image according to an example implementation of the technology. FIG. 10 is a flowchart of a distance presence determining process according to one implementation of the technology. FIG. 11 illustrates conditions for extracting a block having higher reliability according to one implementation of the technology. FIG. 12 is a flowchart of a cumulative luminance difference determining process according to one implementation of the technology.

In an example implementation of the technology, the composite-image generating unit 168 may retrieve any block (e.g., a block 230) from the first distance image 214 illustrated in FIG. 9A. Thereafter, the composite-image generating unit 168 may retrieve a block 232 from the second distance image 224 illustrated in FIG. 9B. The block 232 retrieved from the second distance image 224 corresponds to the block 230 retrieved from the first distance image 214. In other words, the block 230 in the distance image 214 is located in the same position as the block 232 in the distance image 224. The composite-image generating unit 168 may evaluate the reliability of the respective blocks 230 and 232 in terms of first, second, and third parameters described below. When the block 230 or 232 is evaluated as having higher reliability in terms of all the three parameters, the block may be determined to include its distance. When the block 230 or 232 does not satisfy any of the three parameters, the block may be determined to include no distance. Hereinafter, the block determined to include its distance is also referred to as "block with distance", and the block determined to include no distance is also referred to as "block without distance".

In this example implementation, the reliability of the distance of the retrieved block may be evaluated in terms of the first parameter: the distance of the retrieved block may be evaluated as having higher reliability when the retrieved block has a parallax, than when the retrieved block has no parallax. For example, referring to FIG. 10, the composite-image generating unit 168 may search the retrieved block 230 or 232 for a parallax (in Step S300). When the retrieved block has a parallax ("YES" in Step S300), the composite-image generating unit 168 may perform evaluation in terms of the second parameter. When the retrieved block has no parallax ("NO" in Step S300), the composite-image generating unit 168 may determine that the retrieved block is a "block with distance" (in Step S302) without performing the evaluation in terms of the second parameter.

Thereafter, the reliability of the distance of the retrieved block may be evaluated in terms of the second parameter: the distance of the retrieved block may be evaluated as having higher reliability when the number of blocks that are separated from the retrieved block by a distance not greater than a distance threshold is not less than a predetermined number, than when the number of the blocks is less than the predetermined number. For example, the composite-image generating unit 168 may perform grouping of the retrieved block and other blocks of which a horizontal distance x, a height y (from a road surface), and a relative distance z are not greater than the predetermined distance threshold (in Step S304). Thereafter, the composite-image generating unit 168 may determine whether the number of blocks in the resultant group (i.e., area of the resultant group) is not less than the predetermined number (in Step S306). When the number of the blocks is not less than the predetermined number ("YES" in Step S306), the composite-image generating unit 168 may perform evaluation in terms of the third parameter. When the number of the blocks is less than the predetermined number ("NO" in Step S306), the composite-image generating unit 168 may determine that the retrieved block is a "block without distance" (in Step S302) without performing the evaluation in terms of the third parameter.

Thereafter, the reliability of the distance of the retrieved block may be evaluated in terms of the third parameter: the distance of the retrieved block may be evaluated as having higher reliability when the cumulative luminance difference (DCDX) of the retrieved block is not less than a predetermined value, than when the cumulative luminance difference of the retrieved block is less than the predetermined value. For example, the composite-image generating unit 168 may calculate the cumulative luminance difference of the retrieved block (in Step S308). The cumulative luminance difference may be an accumulation of luminance differences along a horizontal direction (i.e., x direction), and may be calculated as follows. Let the retrieved block be the array of four horizontal pixels by four vertical pixels, for example. The cumulative luminance difference of the retrieved block may be set to 0 (zero) first. Thereafter, the luminance difference between two adjacent pixels (e.g., between one pixel and its right adjacent pixel) may be calculated for all of the 16 pixels. When the calculated luminance difference is not less than a predetermined luminance threshold, the cumulative luminance difference may be assigned with 1 point. Accordingly, an upper limit of the cumulative luminance difference may be the total number of the pixels in the retrieved block, and the cumulative luminance difference may be quantified within a range from 0 to 16 points. It may be determined that the luminance difference increases, i.e., the intensity of an edge becomes higher as the value of the points increases.

Thereafter, the composite-image generating unit 168 may determine whether the cumulative luminance difference is not less than the predetermined value (1, for example) (in Step S310). When the cumulative luminance difference of the retrieved block is not less than the predetermined value ("YES" in Step S310), the composite-image generating unit 168 may determine that the retrieved block is a "block with distance" (in Step S312). When the cumulative luminance difference is less than the predetermined value ("NO" in Step S310), the composite-image generating unit 168 may determine that the extracted block is a "block without distance" (in Step S302).

Thereafter, the composite-image generating unit 168 may determine whether the distance presence determining process has been performed for both of the retrieved blocks 230 and 232 (in Step S314). When the distance presence determining process has been performed for both of the retrieved blocks ("YES" in Step S314), the composite-image generating unit 168 may complete the distance presence determining process. When the distance presence determining process has been performed for only one of the retrieved blocks ("NO" in Step S314), the composite-image generating unit 168 may repeat the routine from Step S300 for the other retrieved block.

After the completion of the distance presence determining process for the retrieved blocks 230 and 232, the composite-image generating unit 168 may extract one of the retrieved block 230 and 232 that includes a distance having higher reliability, in accordance with a matrix illustrated in FIG. 11.

For example, when one of the retrieved block 230 and 232 is determined to be a "block with distance" and the other of the retrieved block 230 and 232 is determined to be a "block without distance" as illustrated in (b) and (c) of FIG. 11, the composite-image generating unit 168 may extract the block "with distance" as a block that includes a distance having higher reliability than the block "without distance". When both of the retrieved blocks 230 and 232 are determined to be "blocks without distance" as illustrated in (d) of FIG. 11, the composite-image generating unit 168 may extract no block and determine that the retrieved blocks 230 and 232 include no distance information.

When both of the retrieved blocks 230 and 232 are determined to be "blocks with distance" as illustrated in (a) of FIG. 11, the composite-image generating unit 168 may perform the cumulative luminance difference determining process illustrated in FIG. 12, on the basis of the cumulative luminance difference. Firstly, the composite-image generating unit 168 may refer to the respective cumulative luminance differences of the two retrieved blocks determined to be "blocks with distance", and determine whether these cumulative luminance differences are equal to each other (in Step S350). When the cumulative luminance differences are not equal to each other ("NO" in Step S350), the composite-image generating unit 168 may extract one of the retrieved blocks that has the cumulative luminance difference higher than the cumulative luminance difference of the other of the retrieved blocks as a block that includes a distance having higher reliability (in Step S352).

When the cumulative luminance differences are equal to each other ("YES" in Step S350), the composite-image generating unit 168 may preferentially extract the block 232 of the second distance image 224 captured at a short exposure time (in Step S354). One reason why the block 232 of the second distance image 224 is forcibly extracted when the cumulative luminance differences are equal to each other is that a longer exposure time may be more susceptible to diffusion of excess light, noises, and blurring of the image due to the movement of the vehicle during the long exposure time.

In this example implementation, the block 232 of the second distance image 224 may be extracted when the cumulative luminance differences are equal to each other; however, in another example implementation of the technology, the block 232 of the second distance image 224 may be extracted regardless of the cumulative luminance difference when both of the blocks 230 and 232 are determined to be "blocks with distance".

In this way, the composite-image generating unit 168 may compare, for example, the block 230 of the first distance image 214 illustrated in FIG. 9A and the block 232 of the second distance image 224 illustrated in FIG. 9B, and extracts one of the blocks (extracts the block 230 in this implementation) out of the blocks 230 and 232 to generate the composite image 234 illustrated in FIG. 9C.

Thereafter, the composite-image generating unit 168 may convert the parallax information per block in a detection region of the composite image 234 into the three-dimensional position information by the stereo method described above. The three-dimensional position information may include the horizontal distance x, the height y, and the relative distance z.

As used herein, the term "parallax information" refers to a parallax of each block in the composite image 234, whereas the term "three-dimensional position information" refers to the information on a relative distance of each block in a real space. In a case where the parallax information is derived on a block basis, i.e., on a plurality of pixels basis, rather than on a pixel basis, calculation per pixel may be performed under an assumption that the parallax information derived on a block basis belongs to all the pixels in the block. Since such a conversion into the three-dimensional position information may be referred to a typical technique disclosed in Japanese Unexamined Patent Application Publication No. 2013-109391, for example, the description thereof is not described in detail herein.

[Three-Dimensional Object Identifying Process S210]

The three-dimensional object identifying unit 170 may identify a three-dimensional object on the basis of the composite image 234 generated by the composite-image generating unit 168. For example, firstly, the three-dimensional object identifying unit 170 may perform grouping of blocks each having a horizontal distance x, a height y, and a relative distance z that are not greater than a predetermined distance threshold into one group, on the basis of the parallax information in the composite image 234. The three-dimensional object identifying unit 170 may identify the resultant group as a three-dimensional object. Thereafter, the three-dimensional object identifying unit 170 may identify which specific object the resultant group or the three-dimensional object correspond to. For example, when the three-dimensional object identifying unit 170 confirms a three-dimensional object having a size, shape, and relative speed that are typical to a vehicle, and a light-emitting source, such as a brake light or a high-mount stop light, located at a predetermined position on a rear portion of the three-dimensional object, the three-dimensional object identifying unit 170 may identify the three-dimensional object as a preceding vehicle.

In the example implementations described above, a plurality of combinations of luminance images (two pairs of luminance images in the forgoing example implementations) are captured at respective exposure times different from each other, and the pattern matching may be performed for each of the combinations of the luminance images to generate a plurality of distance images. Thereafter, the plurality of distance images may be combined into the single composite image on the basis of the reliability of distance. Accordingly, it is possible to identify a three-dimensional object in a wide dynamic range even in the case of the stereo matching.

According to an example implementation of the technology, a program also may be provided that causes a computer to serve as the vehicle exterior environment recognition apparatus 120, and a computer-readable recording medium that stores the program. Non-limiting examples of the recording medium may include a flexible disk, a magneto-optical disk, ROM, CD, DVD (Registered Trademark), and BD (Registered Trademark). As used herein, the term "program" may refer to a data processor that is written in any language and any description method.

The central controller 154 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the central controller 154. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the central controller 154 illustrated in FIG. 3.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, although the luminance images may be respectively captured at two different exposure times (i.e., the first exposure time and the second exposure time) in the foregoing example implementations, implementations of the technology are not limited thereto. In another example implementation, two luminance images may be generated for each of three or more exposure times, and three or more distance images may be generated through the pattern matching of these luminance images. Thereafter, the distance images may be combined on the basis of the reliability of the distance. This allows for fragmentation of the exposure time and thereby achieves a distance image (composite image) having a higher precision.

A part or all of the processes in the vehicle exterior environment recognition procedure as disclosed herein does not necessarily have to be processed on a time-series basis in the order described in the example flowchart. A part or all of the processes in the vehicle exterior environment recognition procedure may involve parallel processing or processing based on subroutine.

The invention claimed is:

1. A vehicle exterior environment recognition apparatus comprising:
   a first luminance-image acquiring unit configured to acquire a plurality of first luminance images captured by a plurality of image-capturing units at a predetermined first exposure time, the plurality of image-capturing units being disposed at respective positions different from each other;
   a second luminance-image acquiring unit configured to acquire a plurality of second luminance images captured by the plurality of image-capturing units at a second exposure time, the second exposure time being shorter than the first exposure time;
   a first distance-image generating unit configured to generate a first distance image through pattern matching of the plurality of first luminance images;
   a second distance-image generating unit configured to generate a second distance image through pattern matching of the plurality of second luminance images; and
   a composite-image generating unit configured to generate a composite image by extracting one of a first block of the first distance image and a second block of the second distance image, the one of the first block of the first distance image and the second block of the second distance image including a distance having higher reliability, the first block comprising any of blocks of the first distance image, the second block comprising one of blocks of the second distance image corresponding to the first block,
   wherein the composite-image generating unit evaluates that the reliability of the distance of the first block of the first distance image or the second block of the second distance image is higher when the first block of the first distance image or the second block of the second distance image has a parallax, than when the first block of the first distance image or the second block of the second distance image has no parallax.

2. The vehicle exterior environment recognition apparatus according to claim 1, wherein the composite-image generating unit evaluates that the reliability of the distance of the first block of the first distance image or the second block of the second distance image is higher when a number of blocks that are separated from the first block of the first distance image or the second block of the second distance image by a distance not greater than a distance threshold is not less than a predetermined number, than when the number of the blocks that are separated from the first block or the second block by the distance not greater than the distance threshold is less than the predetermined number.

3. The vehicle exterior environment recognition apparatus according to claim 1, wherein the composite-image generating unit evaluates that the reliability of the distance of the first block of the first distance image or the second block of the second distance image is higher when the first block of the first distance image or the second block of the second distance image has a cumulative luminance difference not less than a predetermined value, than when the first block of the first distance image or the second block of the second distance image has a cumulative luminance difference less than the predetermined value.

4. The vehicle exterior environment recognition apparatus according to claim 2, wherein the composite-image generating unit evaluates that the reliability of the distance of the first block of the first distance image or the second block of the second distance image is higher when the first block of the first distance image or the second block of the second distance image has a cumulative luminance difference not less than a predetermined value, than when the first block of the first distance image or the second block of the second distance image has a cumulative luminance difference less than the predetermined value.

5. The vehicle exterior environment recognition apparatus according to claim 1, wherein the composite-image generating unit evaluates that one of the first block of the first distance image and the second block of the second distance image that has a cumulative luminance difference higher than a cumulative luminance difference of the other of the first block of the first distance image and the second block of the second distance image includes the distance having higher reliability.

6. The vehicle exterior environment recognition apparatus according to claim 2, wherein the composite-image generating unit evaluates that one of the first block of the first distance image and the second block of the second distance image that has a cumulative luminance difference higher than a cumulative luminance difference of the other of the first block of the first distance image and the second block of the second distance image includes the distance having higher reliability.

7. The vehicle exterior environment recognition apparatus according to claim 1, wherein the composite-image generating unit extracts the second block of the second distance image as the block that includes the distance having higher reliability when the first block of the first distance image has a cumulative luminance difference equal to a cumulative luminance difference of the second block of the second distance image.

8. The vehicle exterior environment recognition apparatus according to claim 2, wherein the composite-image generating unit extracts the second block of the second distance image as the block that includes the distance having higher reliability when the first block of the first distance image has a cumulative luminance difference equal to a cumulative luminance difference of the second block of the second distance image.

9. A vehicle exterior environment recognition apparatus comprising
   circuitry configured to
   acquire a plurality of first luminance images captured by a plurality of image-capturing units at a predetermined first exposure time, the plurality of image-capturing units being disposed at respective positions different from each other,
   acquire a plurality of second luminance images captured by the plurality of image-capturing units at a second exposure time, the second exposure time being shorter than the first exposure time,
   generate a first distance image through pattern matching of the plurality of first luminance images,
   generate a second distance image through pattern matching of the plurality of second luminance images,
   generate a composite image by extracting one of a first block of the first distance image and a second block of the second distance image, the one of the first block of the first distance image and the second block of the second distance image including a distance having higher reliability, the first block comprising any of blocks of the first distance image, the second block comprising one of blocks of the second distance image corresponding to the first block, and evaluate that the reliability of the distance of the first block of the first distance image or the second block of the second distance image is higher when the first block of the first distance image or the second block of the second distance image has a parallax, than when the first block of the first distance image or the second block of the second distance image has no parallax.

10. The vehicle exterior environment recognition apparatus according to claim 9, wherein the circuitry configured to evaluate that the reliability of the distance of the first block of the first distance image or the second block of the second distance image is higher when a number of blocks that are separated from the first block of the first distance image or the second block of the second distance image by a distance not greater than a distance threshold is not less than a predetermined number, than when the number of the blocks that are separated from the first block or the second block by the distance not greater than the distance threshold is less than the predetermined number.

11. The vehicle exterior environment recognition apparatus according to claim 9, wherein the circuitry configured to evaluate that the reliability of the distance of the first block of the first distance image or the second block of the second distance image is higher when the first block of the first distance image or the second block of the second distance image has a cumulative luminance difference not less than a predetermined value, than when the first block of the first distance image or the second block of the second distance image has a cumulative luminance difference less than the predetermined value.

12. The vehicle exterior environment recognition apparatus according to claim 9, wherein the circuitry configured to evaluate that one of the first block of the first distance image and the second block of the second distance image that has a cumulative luminance difference higher than a cumulative luminance difference of the other of the first block of the first distance image and the second block of the second distance image includes the distance having higher reliability.

13. The vehicle exterior environment recognition apparatus according to claim 9, wherein the circuitry configured to extract the second block of the second distance image as the block that includes the distance having higher reliability when the first block of the first distance image has a cumulative luminance difference equal to a cumulative luminance difference of the second block of the second distance image.

* * * * *